United States Patent [19]  
Holler et al.

[11] 4,074,523  
[45] Feb. 21, 1978

[54] PRESSURE ACTUATED COLLAPSIBLE CURTAIN LINERS FOR A GAS TURBINE ENGINE NOZZLE

[75] Inventors: Richard P. Holler, Palm Beach Gardens; Connie W. McMath, North Palm Beach, both of Fla.

[73] Assignee: The United States of America as represented by the Secretary of the Air Force, Washington, D.C.

[21] Appl. No.: 748,581

[22] Filed: Dec. 8, 1976

[51] Int. Cl.² ............... F02K 1/12; F02K 11/02; F02C 7/18
[52] U.S. Cl. ..................... 60/266; 60/271; 239/265.41; 239/127.3
[58] Field of Search .............. 60/261, 266, 271; 239/265.39, 265.41, 265.33, 127.3

[56] References Cited
U.S. PATENT DOCUMENTS

| | | | |
|---|---|---|---|
| 2,708,340 | 5/1955 | Rainbow | 60/266 |
| 2,831,321 | 4/1958 | Laucher | 60/266 |
| 3,098,352 | 7/1963 | Taub et al. | 239/127.3 |
| 3,390,837 | 7/1968 | Freeman | 239/265.41 |
| 3,979,065 | 9/1976 | Madden | 239/265.39 |

Primary Examiner—Robert E. Garrett  
Attorney, Agent, or Firm—Joseph E. Rusz; Henry S. Miller

[57] ABSTRACT

A cooling control system for a convergent-divergent gas turbine exhaust nozzle which permits ducting of cooling air during the non-augmented mode of engine operation. A Curtain Liner is hinged at the forward end and able to fully collapse against the nozzle convergent section cutting off cooling flow. A door, connected to the nozzle, when opened allows cooling air to pass between the nozzle and the curtain liner causing the liner to move away from the nozzle wall and the cooling process to take place. Movement of the curtain is limited by a link at the end remote from the hinge.

2 Claims, 3 Drawing Figures

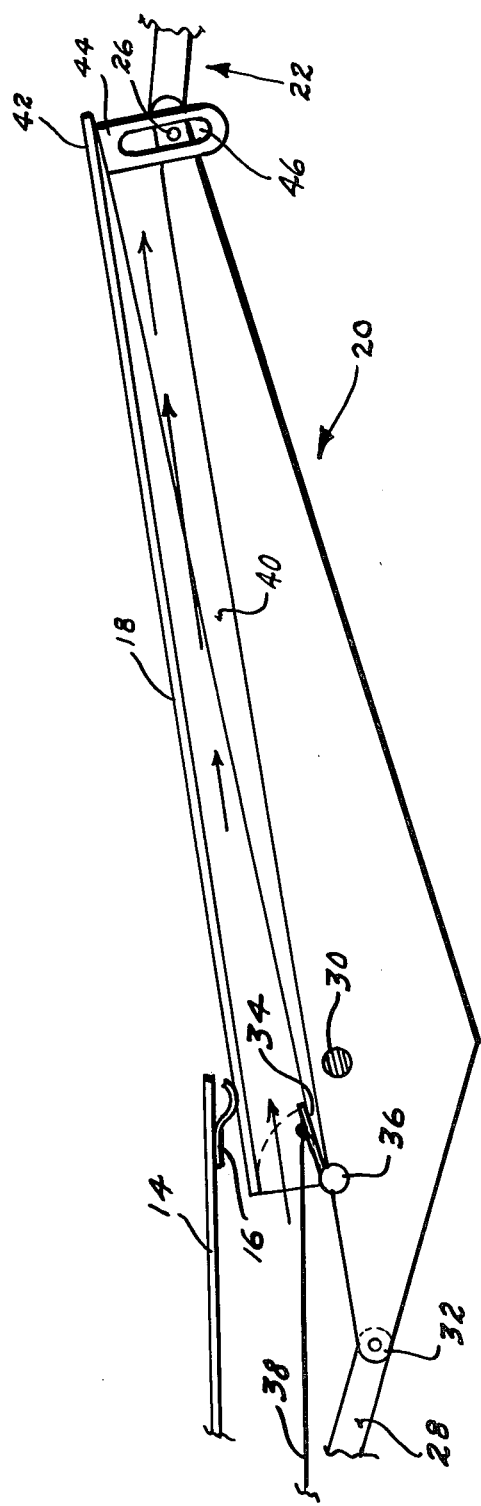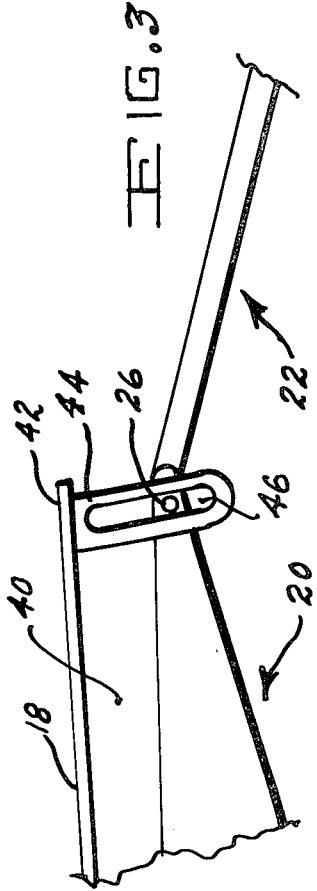

PRESSURE ACTUATED COLLAPSIBLE CURTAIN LINERS FOR A GAS TURBINE ENGINE NOZZLE

STATEMENT OF GOVERNMENT INTEREST

The invention described herein may be manufactured and used by or for the Government for governmental purposes without the payment of any royalty thereon.

BACKGROUND OF THE INVENTION

This invention relates generally to turbo-jet engines and more specifically to a system for controlling curtain liner cooling flow to a convergent-divergent exhaust nozzle during non-augmented flight conditions.

In exhaust nozzles for turbo-jet or turbofan engines, there is a wide variation of the nozzle cooling requirements depending on whether the engine is being operated in the augmented mode, partially augmented mode, or non-augmented mode. During the augmented mode, larger quantities of fuel are consumed and, temperatures are greater requiring additional cooling of the nozzle. One way of achieving this cooling has been to use a curtain of cooling air to flow along the nozzle surface. This curtain of air is controlled generally by a curtain liner which forms a duct with the nozzle surface. Normally, during non-augmented operations, the liner is collapsed against the nozzle wall. Some mechanical or hydro mechanical means are utilized in conjunction with the nozzle adjustment system to move the liner, thereby opening and closing the air passageway.

As with any complex system, the major difficulty with these prior art systems is reliability. In order to insure reliable operation, expensive systems must be replaced after relatively short time periods. A malfunction in this cooling system could see the enging run in full after burner without the curtain liners in position, causing substantial harm to the engine. Known systems also have a multiplicity of parts which require stocking and added weight to the aircraft.

These disadvantages of the prior art are overcome by the system described hereinafter, which is fail-safe, simple in design, easily operated, light in weight and low in cost.

SUMMARY OF THE INVENTION

The invention disclosed herein is a system for cutting off the curtain liner cooling flow to convergent-divergent exhaust nozzles during non-augmented flight conditions. Contrary to existing and known means and systems of starting and cutting off curtain liner cooling air flow, the invention operates as a function of differential air pressure between the engine main air stream over the liner and the pressure under the liner. This pressure is controlled by a door at the forward edge of the liner. When closed, the pressure under the liners drops to throat static and the higher main strain forces the liner to collapse hard against the convergent flaps and seals of the nozzle. The cooling duct is thus closed and the cooling air cut off.

As the door is opened, pressure under the liner is increased, causing the liner to rotate about its hinge away from the nozzle, opening the duct slightly. As the door is opened fully, for example, at maximum afterburner condition, maximum air flow is permitted providing full cooling. The end of the liner, remote from the hinge is restrained in its travel by a link connected to the nozzle wall.

When the door is closed, airflow is cut off and pressure drops, and the curtain liner again collapses against the nozzle wall.

It is therefore an object of the invention to provide a new and improved system for controlling curtain liner cooling flow to a convergent-divergent exhaust nozzle in a turbo jet engine.

It is another object of the invention to provide a new and improved system for controlling curtain liner cooling flow that is simple in design.

It is a further object of the invention to provide a new and improved system for controlling curtain liner cooling flow that is lighter in weight than any similar known systems.

It is still another object of the invention to provide a new and improved system for controlling curtain liner cooling flow that is easily operated and relatively maintainence free.

It is still a further object of the invention to provide a new and improved system for controlling curtain liner cooling flow that is low in cost and inexpensive to install.

It is another object of the invention to provide a new and improved system for controlling curtain liner cooling flow that is fail safe.

It is another object of the invention to provide a new and improved system for controlling curtain liner cooling flow that provides an increase in thrust for the engine.

These and other advantages features and objects of the invention will become more apparent from the following description taken in connection with the illustrative embodiments in the accompanying drawings.

DESCRIPTION OF THE DRAWINGS

FIG. 2 is a side view of the invention with the door open.

FIG. 3 is a side view of the curtain liner and nozzle connecting link.

DESCRIPTION OF THE PREFERRED EMBODIMENT

Figure 1:
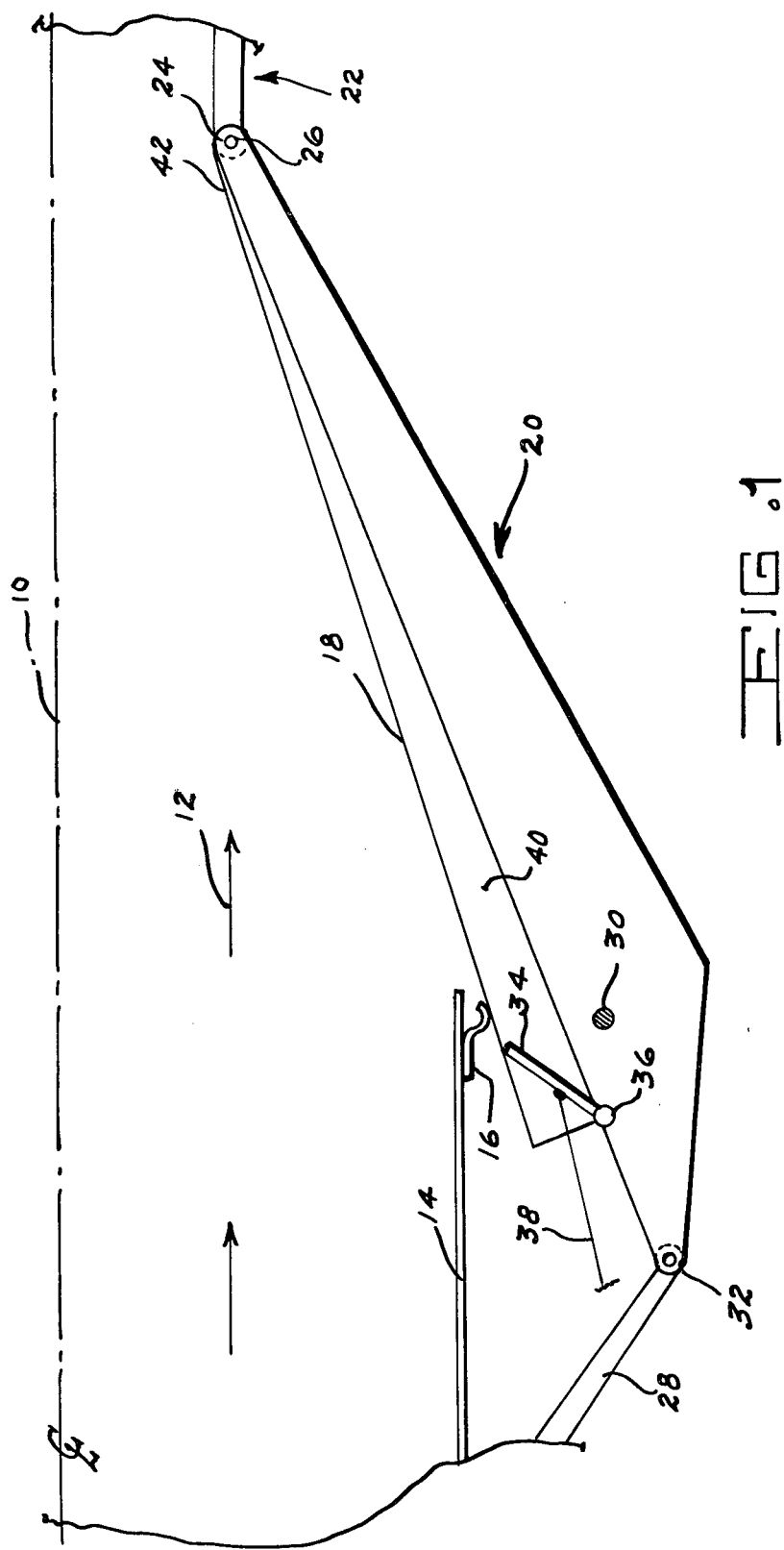
FIG. 1 is a side view of the invention with the door closed.

Referring now to FIG. 1, there is shown the center line of a turbo jet engine 10 with the flow of air and exhaust gasses in the direction shown by the arrows 12. The afterburner liner 14 has a seal 16 which stops the flow of cooling air between it and the curtain liner 18.

The convergent section of the nozzle is shown generally at 20 while the divergent section is shown generally at 22. The convergent-divergent sections of the nozzle are hinged at 24 and rotate about a hinge pin 26. The convergent section 20 is controlled by the rod 28 which is connected to a conventional actuating system, not shown. Movement of rod 28 will cause the nozzle to pivot about point 30 through the action of hinge 32.

A door 34, hinged at 36 is controlled by a cable 38 and blocks the entrance to duct 40 formed by the curtain liner 18 and the convergent section of the nozzle 20. The door being closed allows the liner to collapse against nozzle and further seal the duct at 42.

FIG. 2 shows the invention with the cooling duct 40 in the open operational position. Cable 38 has released door 34 which is moved by the force of cooling air against it, to the open position. Curtain liner 18 is lifted from the nozzle 20 by differential air pressure. Curtain liner 18 is moved to its most extended position and restrained by link 44 which has an opening 46 whin inturn contains an extension of hinge pin 26 at the juncture of the convergent-divergent exhaust nozzle. FIG. 3 shows the control link enlarged for a more clear understanding of its operation. When door 34 is closed by cable 38, curtain liner 18 will again collapse against nozzle plate 20 and the flow of cooling air will be cut off.

It should be understood that the above disclosure describes a single curtain liner and a single nozzle section. Normally, exhaust nozzles for turbojet engines consist of a plurality of such sections positioned around the engine exhaust.

Although the invention has been described with reference to a particular embodiment, it will be understood to those skilled in the art that the invention is capable of a variety of alternative embodiments within the spirit and scope of the appended claims.

What is claimed is:

1. A cooling control system for convergent-divergent turbo jet engine exhaust nozzles comprising: in a convergent exhaust nozzle section, a movable curtain liner means hingedly attached to the exhaust nozzle section and forming a duct for cooling airflow when in a first position; means connected to said curtain liner for limiting movement thereof, door means positioned at one end of said curtain liner and mounted on the exhaust nozzle section and in hinged relationship therewith; means for controlling movement of said door means, and means for creating a seal between the engine and curtain liner.

2. A cooling control system for convergent-divergent turbo jet engine exhaust nozzles according to claim 1 wherein said means for controlling door movement is a cable.

* * * * *